United States Patent [19]
Dial et al.

[11] Patent Number: 6,117,226
[45] Date of Patent: *Sep. 12, 2000

[54] STABLE SUSPENSION OF HYDROCOLLOIDS

[75] Inventors: Harold Dean Dial, El Cajon; Crawford Bryan Skaggs; Walter Gregory Rakitsky, both of San Diego, all of Calif.

[73] Assignee: Pharmacia Corporation, St. Louis, Mo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/656,375

[22] Filed: May 31, 1996

Related U.S. Application Data

[63] Continuation-in-part of application No. 08/476,836, Jun. 7, 1995, abandoned.

[51] Int. Cl.$^7$ ............................. C09D 7/12; C09D 101/02
[52] U.S. Cl. .................................. 106/162.8; 106/182.9; 106/202.1; 524/35
[58] Field of Search ........................... 524/35; 106/162.8, 106/162.9, 202.1

[56] References Cited

U.S. PATENT DOCUMENTS

| | | | |
|---|---|---|---|
| 3,785,437 | 1/1974 | Clampitt et al. | 166/281 |
| 3,891,582 | 6/1975 | Desmarais | 260/17 R |
| 3,948,672 | 4/1976 | Harnsberger | 106/90 |
| 4,021,257 | 5/1977 | Bernett | 106/90 |

(List continued on next page.)

FOREIGN PATENT DOCUMENTS

| | | | |
|---|---|---|---|
| 0290198A1 | 11/1988 | European Pat. Off. | C04B 24/38 |
| 0405306A1 | 1/1991 | European Pat. Off. | C04B 24/00 |
| 0507419A1 | 10/1992 | European Pat. Off. | C12P 19/04 |
| 0654516A1 | 5/1995 | European Pat. Off. | C09K 7/02 |
| 4236680C1 | 10/1992 | Germany | E21B 43/22 |
| 6489696 | 4/1989 | Japan . | |
| 4231434 | 8/1992 | Japan | C22C 21/02 |
| 06001647 | 1/1994 | Japan | C04B 28/02 |
| 6278208 | 10/1994 | Japan | B29C 65/02 |
| 2599041 | 1/1997 | Japan . | |
| 1068886 | 5/1967 | United Kingdom | C04B 13/22 |
| 2080812 | 2/1982 | United Kingdom | C08B 11/00 |
| WO 8600291 | 12/1986 | WIPO | C04B 28/02 |
| WO 9640599 | 12/1996 | WIPO | C04B 24/38 |

OTHER PUBLICATIONS

Abstract 126: 147555p, Bryan Skaggs, et al., "Cement, Concrete, and Related Building Materials", Chemical Abstracts 58, vol. 126, No. 11, (1997) p. 865 (Previously cited by Examiner but no art).
Abstract 106: 89311e, Etsuro, et al., 6001 Chemical Abstracts, (Mar. 23, 1987,)Columbus, OH, US—High strength mortar–concrete composition for underwater concreting.
Jansson et al., "Structural Studies of an Extracellular Polysaccharide (S–130) Elaborated by Alcaligenes ATCC 31555", Carbohydrate Research, pp. 217–223 (Jun. 15, 1985).
Abstract: JP06001647 (Jan. 11, 1994)—Concrete and paint—comprise a builder obtd. By dissociating a micro–organism cellulose, used to control fluidity and viscosity of concrete and paint.
Abstract: JP6219807 (Aug. 9, 1994)—The compsn comprises 100 pts wt cement, 0.1–1.0 pts wt cellulose ether with a viscosity of 100–100000 cps in a 2% aq soln at 20 deg C and 0.05–0.30 pts wt dextrin retarding initial and final setting time of normal Portland cement.
V.S. Ramachandran, "Superplasticizers", Concrete Admixtures Handbook—Properties, Science, and Technology, (1994) by Noyes Publicatios, Library of Congress Catalog Card No. 84–4125, pp. 211–237.
Abstract: EP 654516 (May 24, 1995)—Liquid borehole flushing medium used when excavating seismic boreholes—contains water, bentonite, cements, xanthan, and hydroxyethylcellulose.
Abstract: JP06278208 (Apr. 30, 1996)—To obtain a cement additive capable of being added in a freshly mixed concrete plant, having fluidity required for production, transportation and execution, capable of producing concrete having excellent vibration fluidity free from occurence of swelling caused by empty weight, by blending a reducing agent with a natural polysaccharide or a water–soluble acrylic polymer.
Abstract: JP 04231434 (Mar. 1, 1994)—To disperse and incorporate uniformly a thickener into a concrete by a method wherein a powdery thickener and a powdery dispersing agent are premixed and a required amount of a unit pack wherein they are filled in a bag made of a water-–soluble film is added in a concrete mix and they are kneaded.
Abstract: DE 4236680 (Dec. 2, 1993)—Extracting petroleum from underground beds contg. very salt wate—by polymer flooding process, with pre–injection of part of the polymer soln. contg. a sacrificial substance and with reduced salinity.
Abstract: JP 01089696 (Nov. 6, 1990)—To form underwater concrete composition which is capable of regulation of working time and excellent in early strength developing properties by adopting the specified composition.
CA 126:147555, Skaggs et al, "Uniform suspension of water–soluble polymers . . .", Dec. 19, 1996.

*Primary Examiner*—David Brunsman
*Attorney, Agent, or Firm*—Fitzpatrick, Cella, Harper & Scinto

[57] ABSTRACT

The present invention comprises a stable hydrocolloid composition in which a hydrocolloid, preferably welan gum, is uniformly dispersed in a superplasticizer such as sulfonated naphthalene, sulfonated melamine, modified lignosulfate, their derivatives and mixtures thereof. This is then dispersed in a rheological control agent which is a microbially-produced cellulose fiber composition. The welan gum is rapidly hydratable and useful as a stabilizing additive in many cement and drilling fluid applications, insulation fluids and de-icer compositions.

11 Claims, No Drawings

U.S. PATENT DOCUMENTS

| | | | |
|---|---|---|---|
| 4,041,234 | 8/1977 | Maske | 536/114 |
| 4,043,827 | 8/1977 | Bernett | 106/92 |
| 4,217,229 | 8/1980 | Watson | 252/8.55 R |
| 4,342,866 | 8/1982 | Kang et al. | 536/119 |
| 4,462,836 | 7/1984 | Baker et al. | 106/92 |
| 4,487,864 | 12/1984 | Bermudez et al. | 524/2 |
| 4,559,149 | 12/1985 | Shell | 252/8.55 R |
| 4,662,943 | 5/1987 | Baker et al. | 106/93 |
| 4,792,415 | 12/1988 | Colegrove | 252/308 |
| 4,963,668 | 10/1990 | Allen et al. | 536/114 |
| 4,981,520 | 1/1991 | Hoskin et al. | 106/208 |
| 5,004,506 | 4/1991 | Allen et al. | 106/729 |
| 5,151,131 | 9/1992 | Burkhalter et al. | 106/822 |
| 5,174,821 | 12/1992 | Matsuoka et al. | 106/730 |
| 5,175,277 | 12/1992 | Rakitsky et al. | 536/114 |
| 5,175,278 | 12/1992 | Peik et al. | 536/123 |
| 5,180,430 | 1/1993 | Gartner et al. | 106/730 |
| 5,207,826 | 5/1993 | Westland et al. | 106/163.1 |
| 5,228,524 | 7/1993 | Johnson et al. | 175/72 |
| 5,290,768 | 3/1994 | Ramsay et al. | 514/54 |
| 5,295,752 | 3/1994 | Kawamoto et al. | 400/606 |
| 5,362,713 | 11/1994 | Westland et al. | 507/110 |
| 5,447,197 | 9/1995 | Rae et al. | 166/293 |

STABLE SUSPENSION OF HYDROCOLLOIDS

RELATED APPLICATIONS

The present application is a continuation-in-part (CIP) of U.S. Ser. No. 08/476,836 filed Jun. 7, 1995 now abandoned.

FIELD OF THE INVENTION

The present invention relates generally to industrial gums and their use in cements, concrete masonry grouts, oil field drilling fluids and the like. More specifically, the invention relates to an improved hydrocolloid composition such as welan gum and its numerous applications in this area.

BACKGROUND OF THE INVENTION

This invention is a rheological modifier for organic and inorganic salt systems. One use of the invention is to stabilize liquid mixtures used in oil well and industrial applications specifically for cementitous applications. Concretes and mortars are cement compositions additionally containing aggregate (e.g., sand and rock) and water. When water is added to the cement, this forms a paste which hardens to a solid structure. Various additives have been used in these cement compositions to modify their properties for specialized applications. For example, long fibers such as asbestos reduce the sagging of these pastes and thus is beneficial when applying tiles to a vertical surface. Freezing point depressants are used when cements are to be poured in subfreezing temperatures. Cellulosic based polymers have been used in cements to control water retention and working time. Clays such as bentonite have also been used for this purpose. Other polymers, such as the polyvinyl alcohols and methyl methacrylates, have been used to reduce friction when pumping these pastes and to otherwise modify their workability. Fumed silica is used as an additive to make stronger concrete with reduced permeability.

The term "cement compositions" refers to hydraulic cements such as finely ground and calcined calcium silicates and calcium aluminates which when mixed with water react to form a hard, rock-like mass. There are many well known cement compositions such as: portland cement, portland pozzolan cement (containing about 15–40% pozzolan), blast furnace slag cement, slag cement (containing blast furnace slag and hydrated lime), masonry cement (e.g., adhesive mortars), construction concrete. (containing sand and aggregate, oil-well cement (i.e., cements with retarders to prevent rapid setting so that they may be used at the high temperature and pressure environments of deep wells), aluminous cement (containing high amounts of calcium aluminates, expansive cements (containing high sulfate and alumina concentrations and which expand on hardening), air entrained cement (containing compounds which retain air bubbles and thus yield frost- and chemical-resistant concretes), lightweight concrete (containing low density materials such as furnace clinker, pumice, foamed slag, fly ash, gas, wood, etc.) heavy concrete (containing dense material such as barite, iron ore (i.e., ilmenite or hematite), steel, etc.), and low heat concrete (with modified compositions that minimize heat generation during the setting process).

With respect to oil field cements, it is desirable, while drilling a subterranean well, to line the surface of the hole with a pipe known as casing. The casing is held in place by attaching the casing to the bore hole wall with a cement slurry. The cement slurry is put in place by pumping the slurry down the inside of the casing to the bottom of the hole and up the annulus between the casing and borehole wall. The cement is then allowed to set for several hours to gain strength before any other operation is commenced.

The main purposes of primary cementing are:
1. Most importantly, to allow the segregation of individual formations behind the pipe so that fluids from one formation cannot flow into another, i.e., the cementation of an oil/gas well. This allows for the production from a specific zone.
2. To add support for the casing by physically bracing or preventing the formation of pressure imposed on the casing.
3. To retard corrosion by minimizing contact between the casing and corrosion formation waters.

Oilfield cements are similar to those used in construction (i.e., portland cement). The American Petroleum Institute has set specifications for oilfield cements. These as classified as "A" through "H", "J" and "N", all of which the present invention is useful in.

Cement additives in oilfield cements are materials mixed in the slurry for one or more of the following purposes:
1. Reducing or increasing density;
2. Increasing volume at reduced unit cost;
3. Accelerating or retarding slurry thickening time;
4. Increasing strength;
5. Preventing loss of whole cement slurry;
6. Increasing or improving the cement's durability;
7. Decreasing water loss from the slurry;
8. Increasing or decreasing the viscosity of the cement slurry; and
9. Preventing gas migration.

The water loss of a "neat" cement slurry (cement and water only) is very high and rapid. When a slurry contacts a porous formation rock (such as an oil bearing sandstone) it may become quickly dehydrated by the water filtering into the formation. This causes the cement to "flash set." This may cause the casing to stick to the borehole before all the slurry is pumped in the annulus or before the casing is in the proper position.

Bentonite in concentrations of 0–14% (wt./wt. of dry cement) has been used in the past to control the water loss from the slurry. Cellulosic polymers such as carboxymethylhydroxyethyl cellulose (CMHEC) and hydroxyethyl cellulose (HEC) have also been used as water loss control agents and control the set of the cement at levels from about 0.2% to 0.9%.

Welan gum is an industrial grade of a bacterial polysaccharide produced by the growth of the Alcaligenes strain ATCC 31555 in a pure culture fermentation using carbohydrates as a carbon source. The product is recovered from the fermentation broth by precipitation with alcohol. Welan gum is a polysaccharide gum which comprises principally a heteropolysaccharide containing the neutral sugars D-glucose, D-glucuronic acid, L-rhamnose and L-mannose and glucosidically linked acetyl ester groups. The structure of this polysaccharide is described in Jansson P E, Linberg B, and Wildmalm G (1985) *Carbohydrate Research* 139, 217223.

The rapidly hydrating welan gum composition used in the present invention is a novel combination of welan gum and a superplasticizer. U.S. Pat. No. 4,342,866, to Kang et al., describes a procedure for making welan gum and this is hereby incorporated by reference.

U.S. Pat. No. 4,981,520 to Hoskin et al., discloses a welan gum composition comprising welan gum, a phenolic resin such as resorcinol and an aldehyde. The compositions form stable gels in low salinity brines and are useful in selectively plugging highly permeable zones in a subterranean formation such as oil wells. This improves sweep efficiency during fluid flood oil recovery processes.

U.S. Pat. No. 4,963,668 to Allen et al., teaches the use of a low viscosity welan gum in cement compositions that allegedly exhibit improved workability, suspension of aggregates flow characteristics and resistance to water loss. Preferably, the range of amounts of welan gum used is from 0.1–0.5%.

U.S. Pat. No. 5,004,506 also to Allen et al., teaches welan gum in cement compositions as before, wherein a dispersant such as sodium citrate, sodium naphthalene sulfonates and the like, is added to reduce the viscosity of cement slurries and to serve as an aid in fluid loss control by dispersing the particles in the slurry.

U.S. Pat. No. 5,175,277 to Rakitsky et al., teaches and claims a rapidly hydratable welan gum which can be mixed with a carrier that is usually a superplasticizer, i.e., a dispersant. This is added to a dry cement/water premix and improves the cements workability, its fluid retention and prevents settling.

Finally, U.S. Pat. No. 5,290,768 teaches and claims a welan gum composition comprising welan gum and ethylene glycol. The composition displays unique viscosity and thermal properties which makes it an excellent insulation material.

None of the cited prior art however, discloses a stabilized suspension comprised of a hydrocolloid such as welan gum or hydroxypropylmethyl cellulose and a superplasticizer selected from the group consisting of sulfonated naphthalene, sulfonated melamine, modified lignosulfate, their derivatives and mixtures thereof. Moreover, none of the prior art discloses welan gum/superplasticizer compositions that are ground to an extremely fine particle size so as to afford its suspension superior viscosity and flow characteristics when used in cement, grout and oil field applications.

SUMMARY OF THE INVENTION

The present invention comprises a stable hydrocolloid composition in which the hydrocolloid is uniformly dispersed in a superplasticizer such as sulfonated naphthalene, sulfonated melamine, modified lignosulfate, their derivatives and mixtures thereof. Suitable hydrocolloids include welan gum, methylcellulose, hydroxypropylmethyl cellulose (HPMC), hydroxyethyl cellulose (HEC), polyvinyl alcohol (PVA), starch, and the like. The mixture is then stabilized by a rheological control agent consisting of reticulated cellulose fibers. The composition is rapidly hydratable and useful as a stabilizing additive in many cement and drilling fluid applications.

DETAILED DESCRIPTION OF THE INVENTION

The present invention is comprised of a highly stabilized suspension consisting preferably of welan gum, or a similar hydrocolloid, that is uniformly dispersed in a superplasticizer together with a rheological control agent. The suspension provides a flowable welan gum product that hydrates rapidly and can be metered and dispersed into concrete, grout and related cement formulations using standard equipment known in the art. The welan and superplasticizer are mixed and when combined with the rheological control agent, improve the suspensions stability, increases the gums hydration rate and is not plagued with the associated dust problems of welan gum compositions known in the art.

Previously developed suspensions of welan gum, xanthan gum and other hydrocolloids, especially at low concentrations, are not generally stable and particles settle within a brief period of time. These suspensions also possess a slower rate of hydration which is a critical factor in the preparation of cement, grout and/or concrete useful in a number of applications including anti-washout compositions in oil and gas recovery operations. Moreover, it is a further object of this invention to use welan gum and other hydrocolloids as a suspending agent for cement slurries.

Welan gum is novel heteropolysaccharide that exhibits physico-chemical properties that make it an excellent thickening and stabilizing agent in aqueous systems. Produced by the bacterial fermentation of carbohydrates by species of the genus Alcaligenes, the process for its preparation is fully set forth in U.S. Pat. No. 4,342,866 to Kang et al. which is hereby incorporated by reference. The heteropolysaccharide is primarily a carbohydrate polymer comprised of from about 11.0% to about 15% glucuronic acid together with the sugars mannose, glucose and rhamnose in approximately a 1:2:2 ratio, respectively. The polymer has about 2.8% to 7.5% O-acetyl groups.

Heteropolysaccharide S-657 is a polymer prepared by the fermentation of *Xanthanomas campestris* ATCC 53159 and is comprised of carbohydrate, 12% protein and about 7% O-acetyl acyl groups. The carbohydrate portion is comprised of about 19% glucuronic acid and the neutral sugars rhamnose and glucose in an approximate molar ratio of 2:1, respectively. The bacterial strain, the fermentation conditions, reactants and the isolation of the polymer are fully set forth in U.S. Pat. No. 5,175,278 to Peik et al. which is hereby also incorporated by reference.

Xanthan gum and rhamsan gum are other hydrocolloids useful in the compositions of the present invention that improve the workability of cement slurries. They are also heteropolysaccharides produced by a fermentation process using the bacterial strains *Xanthanomas campestris* and alcaligenes strain ATCC No. 31961, respectively, that metabolize a carbohydrate source. The fermentation process, culture conditions and the isolation/recovery of xanthan gum is set forth in U.S. Pat. No. 4,041,234 to Maske which is hereby incorporated by reference. Carboxymethyl hydroxyethyl cellulose (CMHEC), hydroxypropylmethyl cellulose, hydroxyethyl cellulose and mixtures thereof are all water soluble polymers useful as the suspended polymer in the practice of the present invention. Although these compounds are known to be excellent viscosifiers and suspending agents in aqueous brines, it was unexpected that the polymers would be compatible with and could be used to increase the suspension properties of cement slurries.

A number commercially available polymers are compatible or functional in cement slurries. The compatibility and suspension properties of welan gum are advantageous in several oilfield and industrial applications. For example, welan gum increases the workability of cement compositions, i.e., it improves the ability of cement slurries to be easily placed in crowded areas such as around reinforcing bars without the formation of "bleed water" and aggregate settling. Under such conditions a stiff or "dry" concrete slurry would be extremely difficult to position but a more mobile "wet" slurry would produce a weak concrete and would allow settling of the aggregate. An additional advantage of the welan gum or other similar hydrocolloid concrete is the ability to place and set the formations without the need for vibrators.

The superplasticizer essentially functions as a delivery vehicle for materials i.e., the hydrocolloids such as welan gum as the combination of the two form a dry solid, stable suspension. The welan gum, by its very nature, is rapidly hydratable and is uniformly dispersed in the plasticizer. The suspension remains stable for matters even at elevated temperatures over 100° F.

Superplasticizers are known to function as high range water reducers (HRWR) in the cement industry and as dispersants in the oilfield recovery industry as they reduce the required water content of cement and washout compositions up to 30%. Suitable plasticizers useful in the practice of the present invention consist of sulphonated naphthalene, sulphonated melamine, modified lignosulfonate, their derivatives and mixtures thereof. Suitable derivatives include polynaphthalene sulphonate, sulphonated naphthalene formaldehyde, sulphonated melamine formaldehyde and the like. Other derivatives include the sodium salt of the sulphonated melamine formaldehyde, the sodium salt of sulphonated naphthalene formaldehyde and the calcium salt of sulphonated naphthalene formaldehyde. Sulfonated naphthalene-formaldehyde condensate is commercially available as Disal® Handy Chemical Co., Montreal, Canada and sulfonated melamine formaldehyde condensate is available as Melament F-10® SKW Inc., Karsburg, Germany. Sulfonic-acid esters, carbohydrate esters, their derivatives and mixtures thereof are also useful as suitable superplasticizers herein.

The hydrocolloid and plasticizer are mixed generally in a weight percentage ratio range of from about 1:30 to 1:5, respectively, and either alone or together are mixed with a bentonite extender and are subsequently wet-milled in a milling apparatus such as a Hobart mixer or a Dyno-Mill to a uniform, extremely small particle size range of from about 3 $\mu$m to about 500 $\mu$m. Preferably, the hydrocolloid and plasticizer are ground into particles of from about 50 $\mu$m to about 200 $\mu$m.

Related patent application U.S. Ser. No. 08/476,836 filed on Jun. 7, 1995 describes a stabilized hydrocolloid composition in which a hydrocolloid such as welan gum is wet-milled with a superplasticizer such as lignosulfate or sulfonated melanine formaldehyde condensate to form a stabilized composition with decreased the particle size. The wet-milling process decreases particle size but also increases particle number and hence the surface area of the particles. This change in particle morphology changes the rheology of the composition and results in a stabilized free-flowing system.

In the present invention, the hydrocolloid and superplasticizer need not be wet-milled in order to produce a stabilized, free-flowing system. It was surprisingly discovered that if a rheological control agent or binding agent is added to the composition without wet-milling, improved stability and flow characteristics are obtainable in a dry composition. The rheological control agent is preferably a microbially produced cellulose fiber produced under agitated conditions using a strain of Acetobacter such as *A. aceti* (ATTC No. 53263), or *A. pasteurianus* (ATCC No. 53524). The process for the fermentation of the cellulose fibers, its isolation and recovery as well as the microorganisms and cultures are all clearly set forth in U.S. Pat. No. 5,207,826 to Westland et al. which is hereby incorporated by reference.

A rheological control agent is a compound or composition that modifies any material in which it is placed with respect to its elasticity and flow characteristics. The cellulose fibers that comprise the rheological agent of the present invention are very fine cellulose fiber strands that form a highly reticulated, three-dimensional structure. The fibers are believed to act as a binding agent by physically entangling the other elements or compounds of the cement, thereby enhancing the flow properties of the superplasticizer. The cellulose fibers binding agent composition is commercially available under the trade name Cellulon® (Monsanto Co., St. Louis, Mo.).

Surprisingly, only a very small amount of the microbially-derived cellulose fiber composition need to be added to the hydrocolloid/superplasticizer blend to realize the improved results. The cellulose fibers are added to the blend in an amount of from about 0.01 wt. % to about 1.0 wt. % based on the total weight of the cement additive composition. Preferably, the rheological control agent is added in an amount of from about 0.05 wt. % to about 0.08 wt. % based on the total weight of the composition.

Various combinations can be employed using the components of the present invention for specific applications. The rheological control agent can be used in aqueous systems together with the superplasticizer and water soluble polymers to prepare cements and/or grouts with improvised deformation flow and tensile strength characteristics. When the organic salts are employed as the superplasticizer, the rheological control agent may serve as a product delivery vehicle for the water soluble polymers for use in a number of viscosity enhancer and texture modifier applications.

Aqueous compositions comprising the cellulose fiber rheology control agent, superplasticizer and water soluble polymers are also useful as oil well spacer fluids which are used to separate the drilling fluid from cement slurries as cement is pumped into the well bore.

These spacer fluids are generally comprised of highly saturated salt solutions. These can consist of sodium chloride (NaCl), potassium chloride (KCl) calcium chloride (CaCl$_2$) and mixtures thereof. The spacer fluids must be highly saturated salt solutions so that the mineralized salt that exists in the rock and soil surrounding the well bore is not dissolved and drawn into solution which would further viscosify and break down the system at the high temperatures encountered during drilling operations.

The following examples are provided to more specifically set forth and teach means to prepare and utilize the hydrocolloid suspensions of the present invention. They are for illustrative purposes only however, and it is recognized that minor changes and variations can be made with respect to the components and parameters of the composition and process. To the extent that any such changes do not materially alter the final product or result they are to be considered as falling within the spirit and scope of the invention as recited by the claims that follow.

EXAMPLE 1

Two stabilized uniform aqueous suspensions of the present invention were prepared using the following components. The percentages given were on a weight percentage basis of the total weight of the suspension.

|  | Formulation A | Formulation B |
| --- | --- | --- |
| Welan gum | 6.0% | 10% |
| Cellulon | 0.75% | 0.75% |
| Sulfonated melamine formaldehyde condensate | 30% | 40% |

The aqueous dispersions were prepared by combining the above ingredients with a sufficient amount of water to give solids at 100%. The hydrocolloid/super plasticizer particles were uniformly suspended and dispersed throughout the volume of solvent. The samples were placed in storage for 110 days and subjected to numerous hot/cold variations in temperature fluctuations. Even after 110 days no sedimentation was observed.

EXAMPLE 2

Two injection grout formulations were prepared using cement components known in the art including a suspension comprised of the following. The percentages given are a weight percent basis of the total masonry grout composition.

|  | Formulation A | Formulation B |
| --- | --- | --- |
| Welan gum | 10% | 6.0% |
| Welan mesh size | 80 | 200 |
| Cellulon | 0.75% | 0.05% |
| Sulfonated naphthalene formaldehyde condensate | 1.5% | 1.5% |

The suspension was produced using a high shear Hobart mixer.

The suspensions were mixed from 3.0 to 10.0 minutes to insure that the welan particles were uniformly distributed and not aggregated into clusters. The remaining grout components were then added and thoroughly mixed in a 1:1 water:grout ratio to distribute the stabilized suspension throughout the grout. Both grout compositions exhibited superior fluid loss control as measured by the Gelman Fluid loss test (10 psi for 10 min) and the higher mixing energy applied, the better the grout composition. Stability is significantly improved by reducing the welan gum particle size range and by removing any excess air from the sheared samples.

What is claimed is:

1. A uniform suspension of a water soluble polymer and a superplasticizer stabilized by a rheological control agent comprising water insoluble microbially derived cellulose fibers.

2. The uniform suspension of claim 1 wherein said water soluble polymer is selected from the group consisting of welan gum, xanthan gum, rhamsan gum, heteropolysaccharide S-567, methylcellulose, carboxymethylhexyl cellulose, hydroxypropyl cellulose, hydroxypropylmethyl cellulose, hydroxyethyl cellulose, polyvinyl alcohol and mixtures thereof.

3. The uniform suspension of claim 2 wherein said superplasticizer is selected from the group consisting of organic salts, organic esters and mixtures thereof.

4. The uniform suspension of claim 3 wherein said organic salt or ester is selected from the group consisting of lignosulfonate, sulfonated melamine formaldehyde condensates, sulfonated naphthalene-formaldehyde condensates, sulfonic acid esters, carbohydrate esters and mixtures thereof.

5. The uniform suspension of claim 4 wherein said water soluble polymer comprises from about 0.5 wt. % to about 25.0 wt. % of the total weight of the uniform suspension.

6. The uniform suspension of claim 5 wherein said superplasticizer comprises from about 25.0 wt. % to about 60.0 wt. % based on the total weight of the suspension.

7. The uniform suspension of claim 6 wherein said rheological control agent comprises from about 0.01 wt. % to about 1.0 wt. % based on the total weight of the uniform suspension.

8. The uniform suspension of claim 7 further comprising a biocide.

9. The uniform suspension of claim 8 wherein said cellulose fiber is produced by the microorganism Acetobacter.

10. The uniform suspension of claim 9 wherein said organic salt is selected from the group consisting of sulfonated melamine-formaldehyde condensate, sulfonated formaldehyde condensate and mixtures thereof.

11. The uniform suspension of claim 1, wherein said cellulose fibers form a highly reticulated, three dimensional structure.

* * * * *

UNITED STATES PATENT AND TRADEMARK OFFICE
CERTIFICATE OF CORRECTION

PATENT NO. : 6,117,226
DATED : September 12, 2000
INVENTOR(S) : Harold D. Dial et al.

It is certified that error appears in the above-identified patent and that said Letters Patent is hereby corrected as shown below:

Title page,
Item [56], References Cited, under OTHER PUBLICATIONS:
ABSTRACTS 58, after "Examiner but", "no art" should read: -- not art --;
ABSTRACT JP6219807, under "V.S. Ramachandran," "Publicatios," should read -- Publications, --;
ABSTRACT DE 4236680, "wate-by" should read -- water-by --.

Column 1,
Line 27, "is" should read -- are --;
Line 47, "aggregate," should read -- aggregate), --;
Line 51, "aluminates," should read -- aluminates), --;
Line 57, "etc.)" should read -- etc.), --.

Column 2,
Line 36, "oil bearing" should read -- oil-bearing --.

Column 3,
Line 22, "cements" should read -- cement's --;
Line 29, "art" should read -- art, --;
Line 65, "improve the suspensions" should read -- improves the suspension's --; and "gums" should read -- gum's --.

Column 4,
Line 50, "number" should read -- number of --.

Column 5,
Line 40, "melanine" should read -- melamine --;
Line 41, "the" should be deleted;
Line 56, " (ATTC" should read -- (ATCC --.

Column 6,
Line 20, "improvised" should read -- improved --;
Line 34, "(KCl)" should read -- (KCl), --.

UNITED STATES PATENT AND TRADEMARK OFFICE
CERTIFICATE OF CORRECTION

PATENT NO. : 6,117,226
DATED : September 12, 2000
INVENTOR(S) : Harold D. Dial et al.

It is certified that error appears in the above-identified patent and that said Letters Patent is hereby corrected as shown below:

<u>Column 7,</u>
Line 1, "hydrocolloid/super plasticizer" should read -- hydrocolloid/superplasticizer --.

Signed and Sealed this

Nineteenth Day of February, 2002

Attest:

Attesting Officer

JAMES E. ROGAN
Director of the United States Patent and Trademark Office